United States Patent [19]
Lin

[11] Patent Number: 5,993,021
[45] Date of Patent: Nov. 30, 1999

[54] DECORATIVE LAMP IN AQUARIUM TANK

[76] Inventor: Wen-Yung Lin, 8F-1, No. 37, Lane 187, Sec. 1, Tun-Hwa S, Road, Taipei, Taiwan

[21] Appl. No.: 09/160,139

[22] Filed: Sep. 25, 1998

[51] Int. Cl.[6] .................................................. F21V 33/00
[52] U.S. Cl. ........................... 362/101; 362/255; 362/806
[58] Field of Search ............................. 362/96, 101, 253, 362/318, 806, 255; 446/156, 159, 485; 119/266, 267

[56] References Cited

U.S. PATENT DOCUMENTS

| | | | |
|---|---|---|---|
| 1,333,454 | 3/1920 | Sato | 119/267 |
| 1,858,991 | 5/1932 | Frost | 362/806 |
| 4,703,720 | 11/1987 | Shipman et al. | 119/267 |

*Primary Examiner*—Y. Quach
*Attorney, Agent, or Firm*—Rosenberg, Klein & Lee

[57] ABSTRACT

A decorative lamp in tubular aquarium includes a tubular water container having water and a plurality of artificial fish therein, a base which is a hollow body for supporting the tubular water container, and a lid covered on the top of the tubular water container. The base comprises a lamp holder having a bulb therein for providing the lighting in the tubular water container, a glass tube receiving the lamp holder and transversally placed in the base for providing a color light in the tubular water container by a color of the glass tube, and an air bubble valve making air bubbles by a pump in the tubular water container to keep those artificial fish in the tubular water container moving.

4 Claims, 3 Drawing Sheets

DECORATIVE LAMP IN AQUARIUM TANK

FIELD OF THE INVENTION

The present invention relates generally to a decorative lamp in tubular aquarium, and more particularly to a simple structure of the decorative lamp in tubular aquarium which enables to change the glass tube easily in the base, so as to maintain the tubular aquarium.

BACKGROUND OF THE INVENTION

A traditional decorative lamp in tubular aquarium usually comprises a container which has water and a plurality of artificial fish therein, a base which supports the tank, and a cover covered on the top of the container. The base also has an air bubble valve for making air bubbles and the glass tube for lighting. When turning the power on, the color of the container is provided by the color of the glass tube to enforce the eyesight effort. The air bubble valve is made air bubbles by a pump to keep those artificial fish moving. However, the base of the container occupies much storage. Furthermore, it is not easily to be repaired when damaged.

SUMMARY OF THE INVENTION

It is the main object of the present invention to provide a decorative lamp in tubular aquarium which has small base. It is another object of the present invention to provide a decorative lamp in tubular aquarium which enables to change the glass tube easily in the base, so as to maintain the tubular aquarium. It is still another object of the present invention to provide a decorative lamp in tubular aquarium which has several different colors of the glass tubes, so as to change the light in tubular water container by changing the color of the glass tube.

In accordance with one aspect of the present invention the decorative lamp in tubular aquarium comprises a base which is a hollow body for supporting the tubular water container, a tubular water container receiving water and a plurality of artificial fish therein, and a lid covered on the top of the tubular water container.

In accordance with another aspect of the present invention, the base further has a lamp holder having a bulb therein for providing the lighting in the tubular water container, a glass tube receiving the lamp holder and transversally placed in the base for providing a color light in the tubular water container by the color of the glass tube, and an air bubble valve making air bubbles by a pump in the tubular water container to keep those artificial fish in the tubular water container moving.

DETAILED DESCRIPTION OF THE PREFERRED EMBODIMENTS

Figure 1:
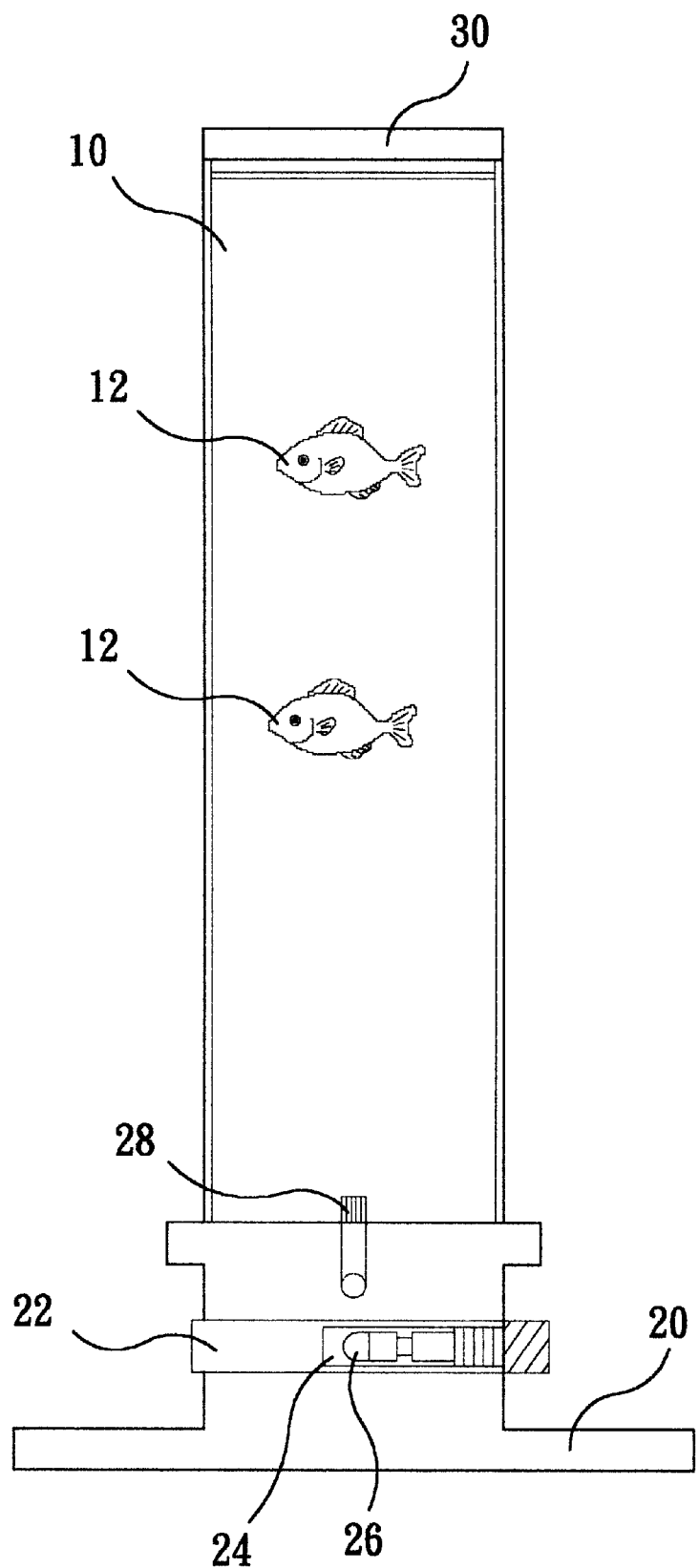
FIG. 1 is a cross-section view of one embodiment of the present invention.

Referring to FIG. 1, a decorative lamp in tubular aquarium in accordance with the present invention comprises a tubular water container 10 made of the transparent material in the press molding, a base 20, and a lid 30. The tubular water container 10 has water and a plurality of artificial fish 12 therein, and the top of the tubular water container 10 is covered by the lid 31). The base 20 which is a hollow body for supporting the tubular water container 10 comprises a lamp holder 24 having a bulb 26 therein for providing the lighting in the tubular water container 10, characteristically a glass tube 22 receiving the lamp holder 24 and transversally placed in the base 20, so that the lamp holder 24 can be drew out from the glass tube 22 for lamp replacing, and an air bubble valve 28 making air bubbles by a pump (not shown) in the tubular water container 10 to keep those artificial fish 12 in the tubular water container 10 moving.

When turning the power on, the color of the glass tube 22 is provided the color light to shine the tubular water container 10. The yellow glass tube is provided the yellow color. The blue glass tube is provided the blue color. The red glass tube is provided the red color.

Figure 2:
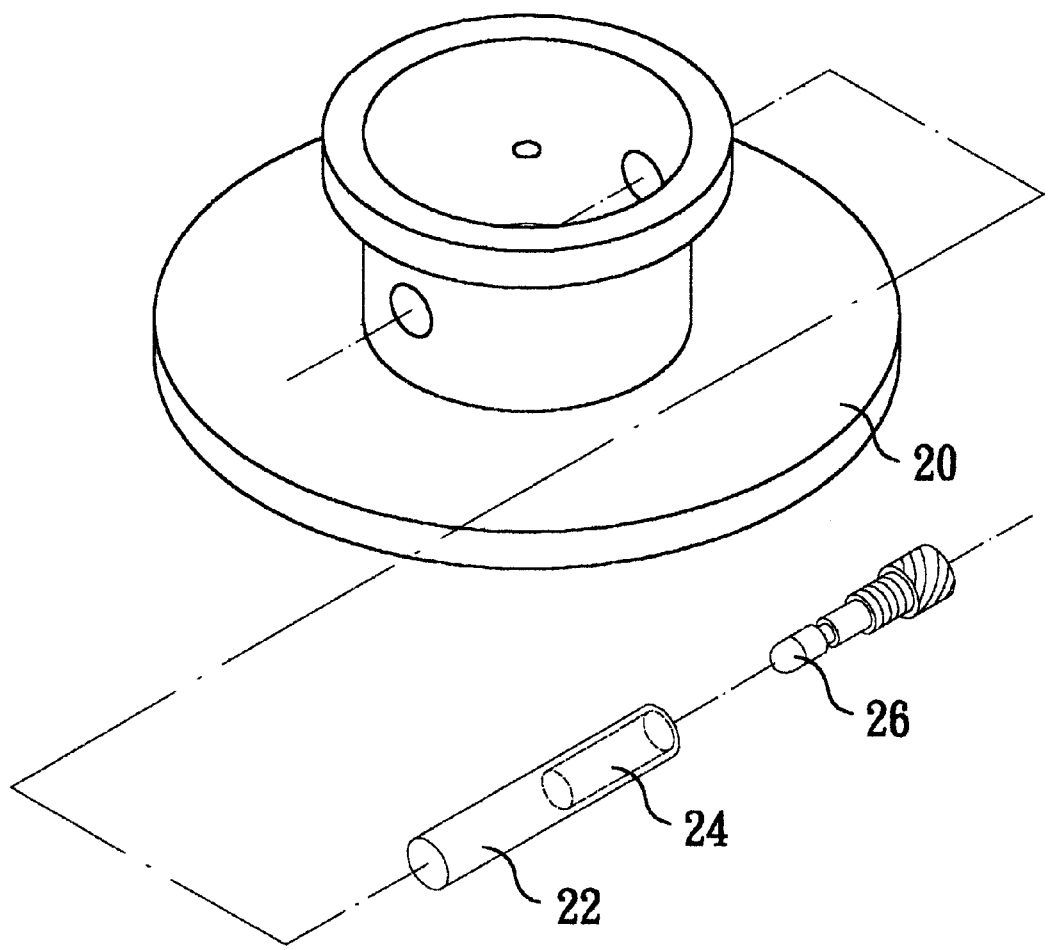
FIG. 2 is an exploded view of the base of the present invention.

Referring to FIG. 2, the base 20 of the present invention is simple and small. When the bulb 26, the lamp holder 24, or the glass tube 22 are damaged and need to be repaired, the user just moves those parts transversally without disassembling the whole tubular aquarium. The user can enable to change the glass tube 22 easily in the base 20, so as to change the light in tubular water container 10 by changing the color of the glass tube 22 anytime.

Figure 3:
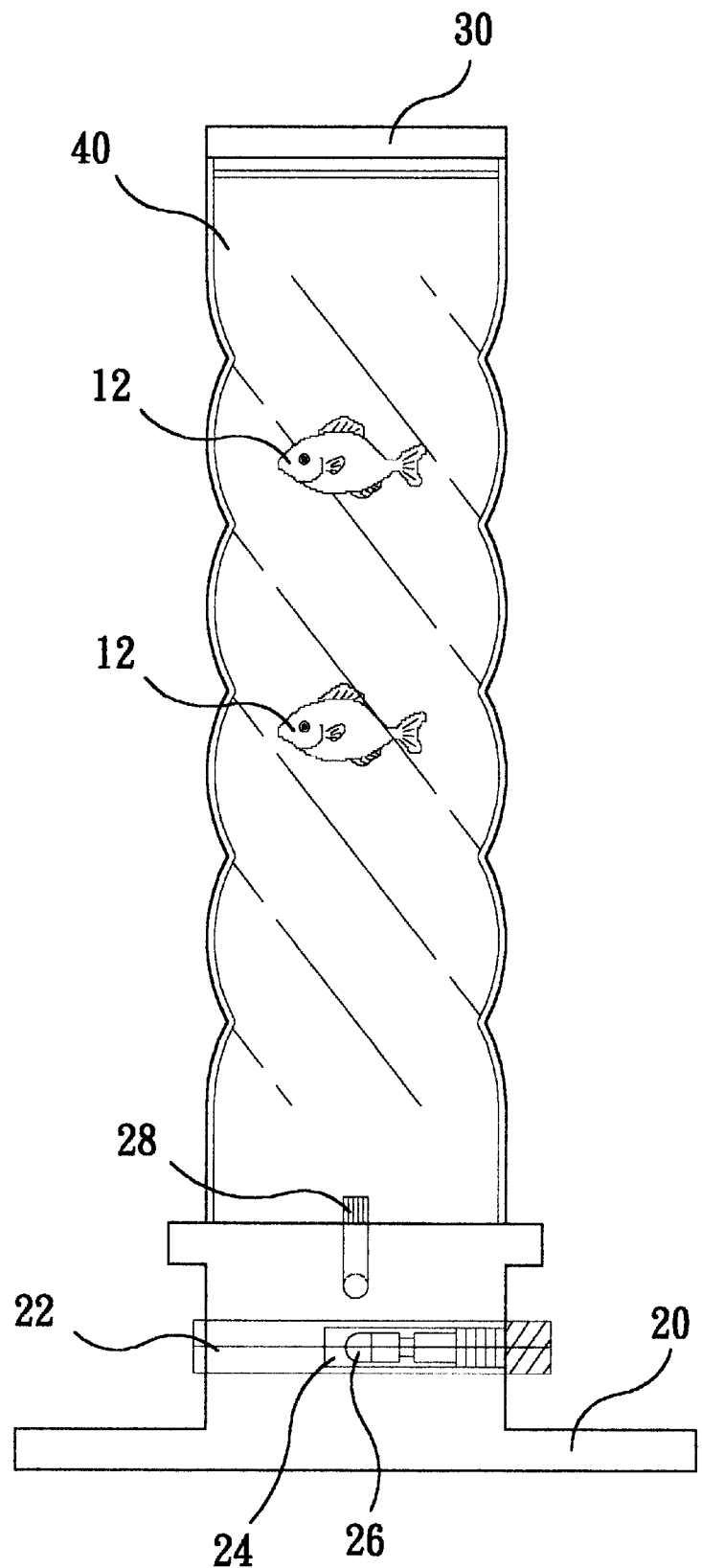
FIG. 3 is a cross-section view of another embodiment of the present invention.

FIG. 3 shows a cross-section view of another embodiment of the present invention. According to this embodiment, the tubular water container 10 is designed to a twisted tubular water container 40 to enforce the present invention for decorating the eyesight effort.

Although various embodiment which incorporate the teachings of the present invention have been shown and described in detail herein, those skilled in the art can readily devise many other varied embodiments that still incorporate these teachings.

It is to be understood that the drawings are designed for purposes of illustration only and are not intended as a definition of the limits and scope of the invention disclosed.

What the invention claimed is:

1. A decorative lamp in tubular aquarium comprising:

a tubular water container having water and a plurality of artificial fish therein, a lid covered on a top of said tubular water container; and a base which is a hollow body for supporting said tubular water comprising:

a lamp holder having a bulb therein for providing the lighting in said tubular water container; and a glass tube receiving said lamp holder and transversally placed in said base for providing a color light in said tubular water container by a color of said glass tube.

2. The decorative lamp in tubular aquarium of claim 1, wherein said tubular water container is a transparent cylinder.

3. The decorative lamp in tubular aquarium of claim 1, wherein said tubular water container is a lucid twisted tubular water container.

4. The decorative lamp in tubular aquarium of claim 1, wherein said lamp holder can be drew out from said glass tube for lamp replacing.

* * * * *